US011263625B2

(12) United States Patent
Glendenning

(10) Patent No.: US 11,263,625 B2
(45) Date of Patent: Mar. 1, 2022

(54) METHOD, DEVICE AND SYSTEM FOR SECURING PAYMENT DATA FOR TRANSMISSION OVER OPEN COMMUNICATION NETWORKS

(75) Inventor: Craig Glendenning, Victoria (AU)

(73) Assignee: BLUECHAIN PTY LTD., Warrandyte (AU)

(*) Notice: Subject to any disclaimer, the term of this patent is extended or adjusted under 35 U.S.C. 154(b) by 1072 days.

(21) Appl. No.: 13/574,193

(22) PCT Filed: Jan. 19, 2011

(86) PCT No.: PCT/AU2011/000055
§ 371 (c)(1),
(2), (4) Date: Nov. 7, 2012

(87) PCT Pub. No.: WO2011/088508
PCT Pub. Date: Jul. 28, 2011

(65) Prior Publication Data
US 2013/0191290 A1     Jul. 25, 2013

(30) Foreign Application Priority Data

Jan. 19, 2010   (AU) .............................. 2010900195

(51) Int. Cl.
*G06Q 20/38*     (2012.01)
*G06Q 20/20*     (2012.01)
(Continued)

(52) U.S. Cl.
CPC ......... *G06Q 20/3829* (2013.01); *G06Q 20/20* (2013.01); *G06Q 20/388* (2013.01);
(Continued)

(58) Field of Classification Search
CPC ...... G06Q 20/223; G06Q 20/32; G06Q 20/20; G06Q 20/40; G06Q 20/3278;
(Continued)

(56) References Cited

U.S. PATENT DOCUMENTS 5,949,044 A * 9/1999 Walker .................. G06Q 20/10
235/379
6,149,058 A * 11/2000 Albaret ................ G06K 7/0013
235/380
(Continued)

FOREIGN PATENT DOCUMENTS

WO     2004049273 A1    6/2004

OTHER PUBLICATIONS

International Search Report (PCT/AU2011/000055).
Written Opinion of the International Searching Authority.

*Primary Examiner* — John W Hayes
*Assistant Examiner* — Edgar R Martinez-Hernandez
(74) *Attorney, Agent, or Firm* — Kutak Rock LLP; Brian L. Main

(57) ABSTRACT

A method for securing payment data for transmission over open communication networks is disclosed. The method comprises establishing a data connection between a first and a second transceiver device, the first transceiver device configured as a merchant device and the second transceiver device configured as a customer transceiver device. The merchant device transmits a first data package which comprises a unique merchant identifier and transaction request data, to the customer transceiver device over the data connection. The merchant device receives a cryptogram from the customer transceiver device. The cryptogram having been generated from using a secret key and a counter value together with the received unique merchant identifier and the transaction request data. The method comprises forming an authorisation request comprising the received cryptogram, merchant identifier and the transaction request data and submitting said authorisation request to at least one of an issuer and an acquirer to facilitate authorisation and processing of said transaction request data.

21 Claims, 5 Drawing Sheets

(51) Int. Cl.
*G06Q 20/40* (2012.01)
*H04L 9/32* (2006.01)

(52) U.S. Cl.
CPC .......... *G06Q 20/40* (2013.01); *H04L 9/3247* (2013.01); *H04L 9/3263* (2013.01); *H04L 2209/56* (2013.01); *H04L 2209/805* (2013.01)

(58) Field of Classification Search
CPC ............. G06Q 20/3674; G06Q 20/401; G06Q 20/4014; G06Q 20/3821; G06Q 20/342; G06Q 20/40145; G06Q 20/3829; G06Q 20/388; G07F 7/025; H04L 2209/80; H04L 9/3226; H04L 63/0428; H04L 63/062; H04L 9/0866; H04L 9/3247; H04L 9/3263; H04L 2209/56; H04L 2209/805; G06F 21/32
USPC ................ 705/44, 64, 67, 75; 380/255, 270; 455/410; 713/168, 186, 161, 182; 340/5.2, 5.61, 5.8; 726/2
See application file for complete search history.

(56) References Cited

U.S. PATENT DOCUMENTS

| | | | |
|---|---|---|---|
| 6,327,578 B1* | 12/2001 | Linehan | G06Q 20/04 705/65 |
| 6,938,019 B1* | 8/2005 | Uzo | G06Q 20/06 380/268 |
| 7,024,395 B1* | 4/2006 | McCown | G06Q 20/0453 235/375 |
| 7,103,575 B1* | 9/2006 | Linehan | G06Q 20/12 235/379 |
| 7,111,789 B2* | 9/2006 | Rajasekaran | G06Q 20/02 235/472.01 |
| RE40,444 E* | 7/2008 | Linehan | G06Q 20/02 705/65 |
| 8,249,935 B1* | 8/2012 | DiMartino | G06Q 20/204 705/16 |
| 8,374,636 B2* | 2/2013 | McDonough | H04L 51/38 455/412.1 |
| 9,280,765 B2* | 3/2016 | Hammad | G06Q 20/12 |
| 2005/0119978 A1* | 6/2005 | Ates | G06Q 20/04 705/67 |
| 2007/0244811 A1* | 10/2007 | Tumminaro | G06Q 20/10 705/39 |
| 2007/0255662 A1* | 11/2007 | Tumminaro | G06Q 20/10 705/79 |
| 2007/0288392 A1* | 12/2007 | Peng | G06Q 20/04 705/72 |
| 2008/0052233 A1* | 2/2008 | Fisher | G06Q 20/102 705/40 |
| 2008/0059370 A1* | 3/2008 | Sada | G06Q 20/02 705/40 |
| 2008/0195498 A1* | 8/2008 | Crawford | G06Q 20/202 705/21 |
| 2008/0208759 A1* | 8/2008 | Royyuru | G06Q 20/4012 705/72 |
| 2008/0301056 A1 | 12/2008 | Weller et al. | |
| 2009/0125429 A1* | 5/2009 | Takayama | G07F 7/0866 705/35 |
| 2009/0216680 A1* | 8/2009 | McCown | G06Q 20/1235 705/75 |
| 2010/0145818 A1* | 6/2010 | Udiani | G06Q 20/02 705/26.1 |
| 2010/0250704 A1* | 9/2010 | Kittel | G06F 21/10 709/219 |
| 2010/0306081 A1* | 12/2010 | Hutchison | G06Q 20/02 705/26.43 |
| 2011/0066550 A1* | 3/2011 | Shank | G06Q 20/1085 705/43 |
| 2011/0068921 A1* | 3/2011 | Shafer | G06Q 10/08 340/571 |
| 2011/0099377 A1* | 4/2011 | Hoornaert | H04L 9/3234 713/172 |
| 2011/0189981 A1* | 8/2011 | Faith | G06Q 20/40 455/414.1 |

* cited by examiner

METHOD, DEVICE AND SYSTEM FOR SECURING PAYMENT DATA FOR TRANSMISSION OVER OPEN COMMUNICATION NETWORKS

CROSS-REFERENCE TO RELATED APPLICATIONS

This is the United States National Stage of Patent Cooperation Treaty Application No. PCT/AU2011/000055 filed Jan. 19, 2011, which claims priority to Australian Patent Application No. 2010900195 filed Jan. 19, 2010, the disclosures of which are incorporated herein by reference in their entireties.

TECHNICAL FIELD

This invention concerns a method, device and system for securing payment data for transmission over open communications networks.

BACKGROUND ART

FIG. 1 schematically illustrates a typical four-party network showing the institutions participating in a transaction over an open network. The network includes the card issuers and the merchant acquirers plus the cardholders (customers) and the merchants. The card issuer distributes cards to consumers, bills them, and collects payment from them. The merchant acquirer recruits merchants to accept cards and provides the front-end service of routing the transaction to the network's processing facilities. The acquirer is responsible for delivering the transaction to the appropriate card issuer so that the customer is billed and the merchant receives funds for the purchase.

The transactions process typically has two major parts. The first is authorisation, and the second is clearing and settlement. Authorisation is the process of obtaining permission from the bank that issued the card to accept the transaction and card detail for payment. Authorisation begins when a consumer presents his or her card to the merchant for a purchase (1). Traditionally, securing of the transaction occurs for authorisation which happens at the point of sale, though more recently transactions are being done in "card not present" situations (for example, online). In recent years, chip and contactless technologies have become increasingly widespread. With particular reference to the payment industry, contact and contactless transactions have advantages over traditional magnetic stripe technologies as chip based technologies have the ability to store and process data more securely.

In contact and contactless situations, merchants usually obtain the transaction information for authorisation electronically, either by having the consumer swipe or insert the card through a terminal at the point of sale or by bringing the card into the vicinity of a terminal or reader. Having obtained card information, the merchant's terminal compiles an authorisation request containing the card information, the transaction amount and the merchant's identification number and sends the authorisation request to the acquirer (2). The acquirer reads the information and sends the authorisation request to the specific issuing bank through a clearing card network (3). The issuing bank conducts a series of checks for fraud and verifies that the cardholder's available funds or credit line is sufficient to cover the purchase before returning a response (4), either granting or denying authorisation. The merchant acquirer receives the response and relays it to the merchant (5).

Acquirer banks, merchants and consumers are demanding that transactions over the internet and other open networks are more secure. Whilst current contact and contactless transactions offer increased security over traditional magnetic stripe technology they do not sufficiently address the level of security required to secure a transaction over the internet or other open networks.

Current systems are prone to "man-in-the-middle attacks" which compromises the authenticity of a transaction. Man-in-the-middle attacks prey on the difficulty of verifying both the authenticity of a transaction as well as the authenticity of the merchant who initiates it. Such attacks act to intercept communication between two devices. In this type of attack malicious software embedded on a computer operates such that it appears to be the merchant to the customer device whilst also appearing to be the customer device to the merchant. Such software may be operable to change the details of the receiving party or the value of the transaction.

SUMMARY OF THE INVENTION

A method for securing payment data for transmission over open communication networks is provided, the method comprising:

establishing a data connection between a first and a second transceiver device, the first transceiver device configured as a merchant device and the second transceiver device configured as a customer transceiver device;

the merchant device transmitting a first data package to the customer transceiver device over the data connection, the first data package comprising a unique merchant identifier and transaction request data;

the merchant device receiving a cryptogram from the customer transceiver device, the cryptogram having been generated using a secret key, a counter value together with the received unique merchant identifier and the transaction request data; and forming an authorisation request comprising the received cryptogram, the merchant identifier and transaction request data and submitting said authorisation request to at least one of an issuer and an acquirer to facilitate processing said authorisation data to the issuer for authorisation.

The open network may be a mobile or an Internet Protocol (IP) network.

Ensuring that the merchant device transmits the unique merchant identifier to the customer transceiver device, for inclusion in the cryptogram, binds the merchant and the consumer to the transaction and minimises the number of exchanges involved in authorisation of a transaction. This is principally due to the acquirer no longer being required to verify the authenticity of the merchant, only that it is a valid merchant. Advantageously the opportunity for third party fraud is substantially reduced.

The step of establishing a data connection between the first and second transceiver devices may comprise establishing a contactless connection or a contact connection. The contactless connection may utilise NFC, Bluetooth, WiFi, SMS, another like contactless technology or a combination thereof. The contact connection may utilise electrical connectivity as is well known by those skilled in the art.

The method may further comprise selectively configuring the first and second transceiver devices as a merchant device and a customer transceiver device respectively. Optionally, the first and second transceiver devices may be respectively configured as a customer transceiver device and a merchant device. In either embodiment, the counter value is preferably stored in a secure area of the customer transceiver device.

The method may further comprise maintaining a counter embodied in the customer transceiver device.

The method may further comprise the customer transceiver device generating the cryptogram. In addition to utilising the secret key, the counter value, the received unique merchant identifier and the transaction request data, other relevant data may be included, including, but not limited to data associated with a transceiver device's technical capability.

The method may further comprise receiving an account selection request from the user of the customer transceiver device. The account selection request may be received via a user interface of either device. In an embodiment in which the account selection request is received via a user interface of the customer transceiver device the method may further comprise transmitting the user selected account selection to the merchant device over the data connection. In an embodiment in which the account selection request is received via a user interface of the merchant device the method may further comprise storing data representative of the user selected account in the memory of the merchant device. The method may further comprise transmitting data representative of the user selected account over the data connection to the customer transceiver device.

Optionally, the method may further comprise retrieving a predetermined default account. The predetermined default account may be stored to memory in the customer transceiver device.

The method may further comprise retrieving the transaction request data, said transaction request data comprising an amount for the transaction, and at least one of a currency code, a time stamp, data representative of the user selected account, and a customer identifier such as a PIN or biometric and a merchant identifier value.

The step of the merchant device transmitting a first data package to the customer transceiver device over the data connection may be preceded by the customer transceiver device requesting the unique merchant identifier and transaction request data.

The first data package may further comprise a unique dynamic value.

The method may further comprise authenticating the legitimacy of the merchant device including:
  the customer transceiver device forming a merchant authentication request, the merchant authentication request requesting from the merchant transceiver device (1) a signed certificate of the issuer which holds as a minimum the unique (merchant) identifier and merchant public key and (2) a signature of the unique dynamic value using the merchant's secure module's private key;
  the customer transceiver device receiving from the merchant device a second data package comprising the issuer's signed certificate and a signature of the unique dynamic value using the merchant's secure module's private key;
  the customer transceiver device verifying the issuer's signed certificate using a certification authority's public key, and once verified, authenticating against stored records the signed unique dynamic value using the merchant public key.

The step of authenticating the legitimacy of the merchant device enables the consumer transceiver device to ensure that it is communicating with an authentic merchant device (one that has been issued by an approved issuer within a defined scheme). It also ensures that the unique identification number provided as part of the transaction request is the same as that signed by the issuer in the signed secure module certificate.

In a second aspect the invention is a transceiver device operable to secure payment data for transmission over open communication networks, the transceiver device comprising:
  an interface module to enable data communication with other transceiver devices;
  a processor coupled to a memory, the memory storing processor control code to selectively control the processor, when running to (1):
    retrieve from memory a unique merchant identifier;
    enable the interface module to transmit the unique merchant identifier and transaction request data to another of said devices;
    receive from the other of said devices a cryptogram, the cryptogram having been generated from a secret key, a counter, the unique merchant identifier and the transaction request data; and
    form an authorisation request comprising the cryptogram, merchant identifier and transaction data, and submitting said authorisation request to at least one of an issuer and an acquirer to facilitate authorisation and processing of said transaction request data; or (2)
    receive a unique merchant identifier and transaction request data from another of said devices;
    retrieve from memory a counter value and a stored secret key;
    generate a cryptogram using the retrieved secret key, the retrieved counter value together with the received unique merchant identifier and transaction request data; and
    transmitting the cryptogram to the other of said devices for subsequent forwarding of an authorisation request to one of an issuer and an acquirer to facilitate authorisation and processing of said transaction request data.

Advantageously, in accordance with embodiments of the invention, the transceiver device is able to be selectively configured to be operable as either a merchant device/terminal or a customer device/terminal.

The transceiver device may be incorporated into a mobile communication device such as a mobile phone, cell phone or iPhone. Optionally, the transceiver device may be separated from but in communication with a mobile communication device. Optionally, the transceiver device may be incorporated into a point of sale device (POS) or separated from but in communication with a POS. In still other arrangements the transceiver device may be integrated into a personal computing device (such as a laptop, PDA, pager) or a device that is separated from but in communication with a personal computing device.

The interface module may be in the form of a contact interface module, a contactless interface module or a dual contact and contactless interface module. In an embodiment utilising a contactless interface module, the interface module preferably incorporates the requisite mechanisms to enable the transfer of data between two devices (such as ISO 7816, NFC, Bluetooth, Wi-Fi, SMS etc). For example, one such contactless interface module may comprise a transponder and an antenna.

The transaction request data may comprise an amount for the transaction, and at least one (or more) of a currency code, a time stamp and a customer identifier such as a PIN or biometric and any other relevant data.

BRIEF DESCRIPTION OF THE DRAWINGS

The prior art has been described with reference to FIG. 1, which illustrates a typical four-party network participating in a payment transaction over an open network.

An example of the invention will now be described with reference to the accompanying drawings, in which.

BEST MODE OF THE INVENTION

Figure 1:
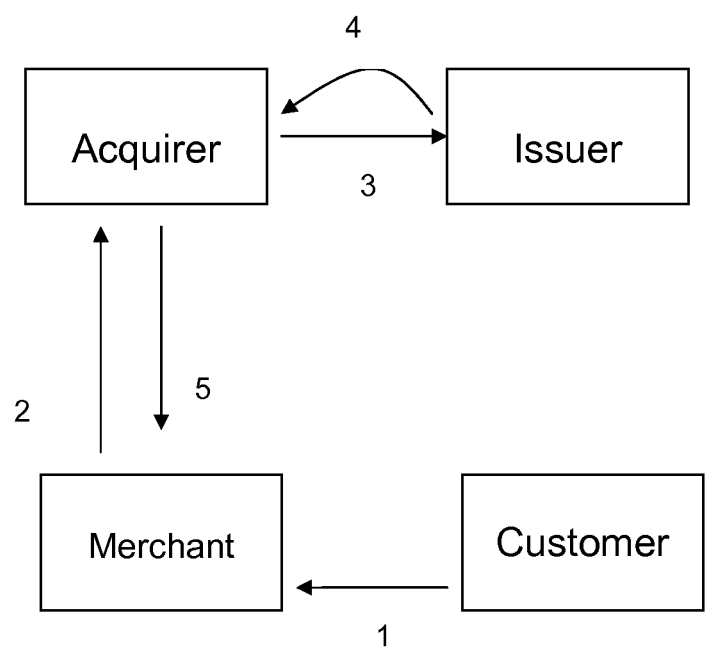
Figure 2:
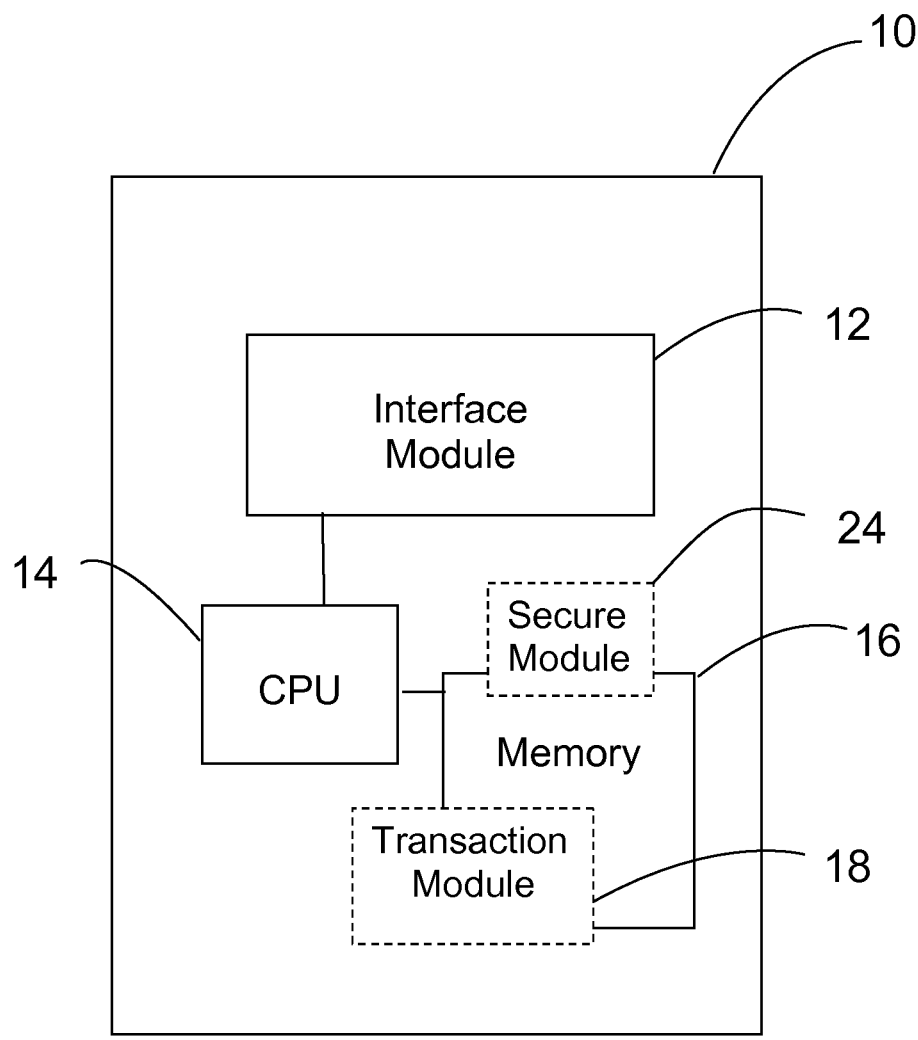
FIG. 2 is a block diagram that schematically illustrates components of a transceiver device for securing transactions over open networks.

FIG. 2 illustrates components of a transceiver device 10 for securing transactions over open networks. It should be appreciated that the term open network, or open communication network, is broadly defined as any wireless, generally unsecured, network, such as the Internet Protocol (IP) network. For instance, the open network infrastructure may comprise the networks commonly referred to as the Internet backbone and each of a local area network (LAN) and a wide area network (WAN). Each of the LAN and the WAN is coupled to the Internet by a router or Network Address Translation (NAT) server and each is capable of transferring IP frames.

The transceiver device 10 is any device that is configured to communicate with another transceiver device. In this example the transceiver device 10 is a device that is incorporated into a mobile communication device in the form of a mobile phone.

As illustrated, the transceiver 10 comprises an interface module in the form of a contact or contactless interface module (CIM) 12. In this example the CIM 12 is a contactless interface module. The CIM 12 may be any mechanism for transferring data between two devices (such as ISO 7816, Near Field Communication (NFC), Bluetooth, SMS etc) and in this application utilises NFC. NFC is a short-range wireless connectivity standard (Ecma-340, ISO/IEC 18092) that uses magnetic field induction to enable communication between the device 10 and a neighbouring device when they're brought within a few centimetres of each other. The standard specifies a way for the respective devices to establish a peer-to-peer (P2P) network to exchange data. Once the P2P network is configured, another technology such as Bluetooth can be utilised to enable longer range communication.

Coupled to the CIM is a central processing unit 14 which controls operation of the device 10 and memory 16. Transaction module 18 is implemented as a software application, computer programs, etc., utilizing any suitable computer language (C, C++, Java, Perl, PHP, etc.) The software is stored as a series of instructions or commands written to memory 16 such that when processor 14 reads the memory, the functions described here-in are performed.

In addition to the programmable portion of memory 16, the memory may include different types of memory, such as volatile and non-volatile memory and read-only memory.

Figure 3:
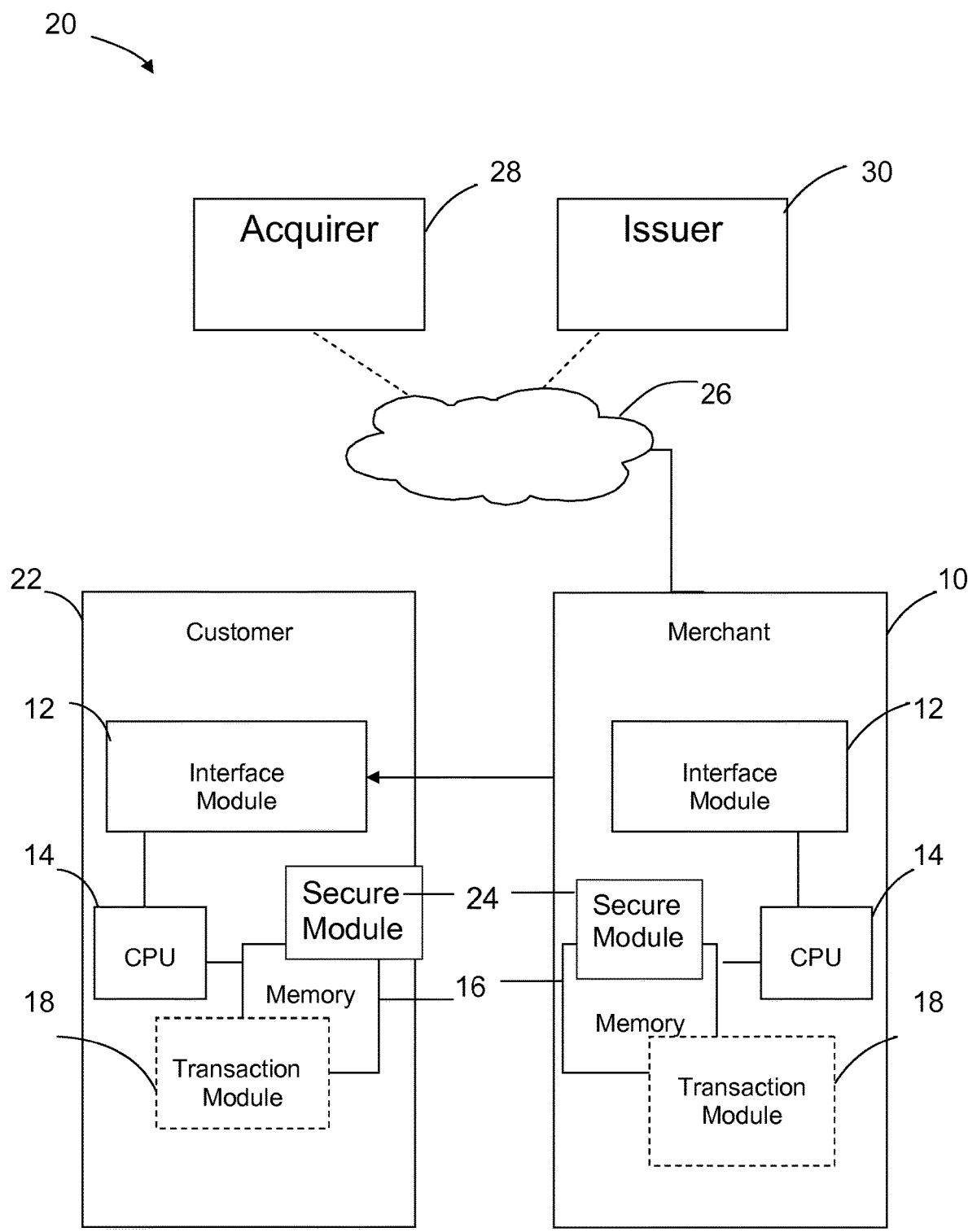
FIG. 3 is a block diagram that schematically illustrates components of a system for securing transactions across open networks.

FIG. 3 illustrates a system 20 in which an embodiment of the invention may be used in order to secure transactions across open networks. Like numbers refer to like components. The system 20 comprises a first transceiver device 10 which in this example is configured as a "merchant device" and a second transceiver device 22 which in this example is configured as a "customer device". In this example, the merchant device 10 and the customer device 22 are mobile enabled NFC capable devices and each is configured to communicate with the other via their respective contactless interfaces 12. Each device 10, 22 is equipped with components described with respect to FIG. 2.

The memory unit 16 of the merchant transceiver device 10 securely stores the unique merchant identifier which identifies the merchant to whom the amount of the transaction is to be credited. The merchant identifier is embedded into the memory of the device 10 during the issuing process, and a copy is retained securely by the acquirer. The memory unit 16 of the customer transceiver device 22 securely stores the user's primary account number ("PAN"), the users personal identification number ("PIN"), an application transaction counter (ATC) and a secret key. The secret key is embedded into the memory of the device 22 during the issuing process, and a copy is retained securely by the issuer 30.

The merchant device 10 communicates with an acquirer 28 and/or an issuer 30 over a network 26. The device may be attached to the network in any suitable manner known in the art. The network 26 may include any type of delivery system including, but not limited to a local area network, wide area network, telephone network, and/or any wired communications network configured to transfer data.

Figure 4:
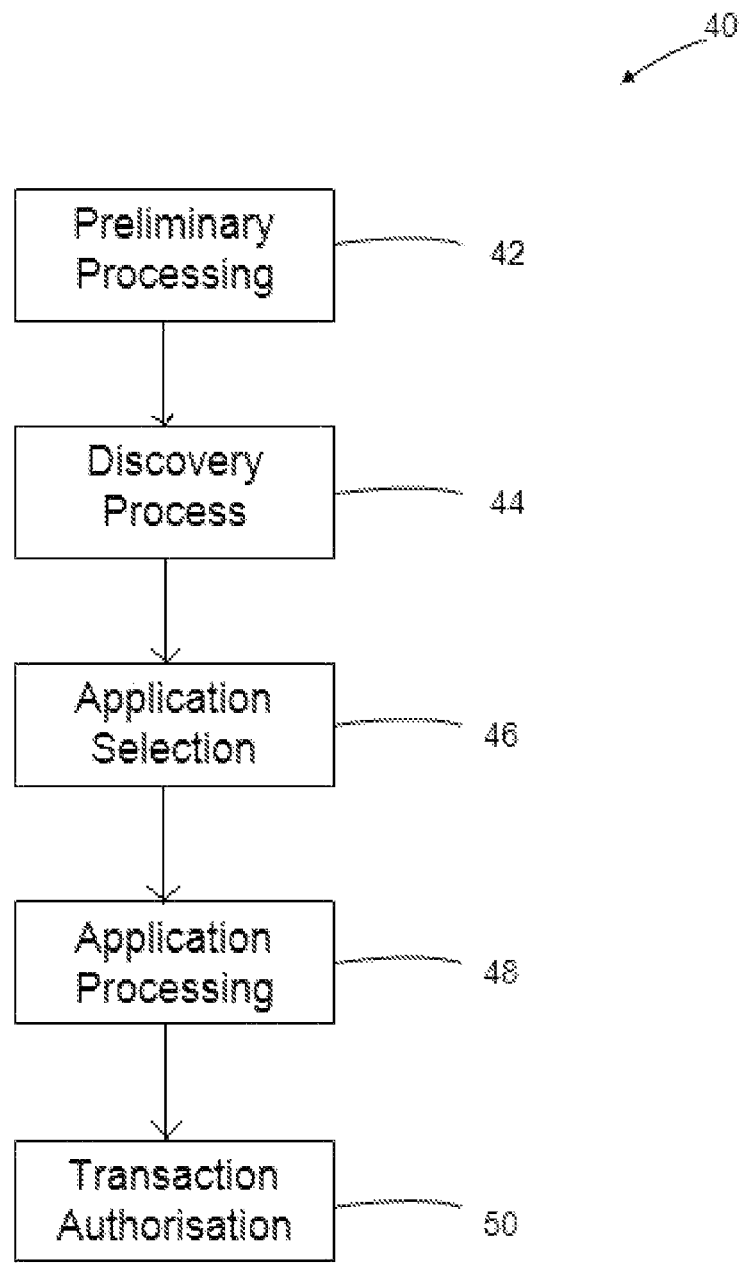
FIG. 4 is a flow chart of the steps involved in securing transactions over open networks.

FIG. 4 illustrates steps of a method 40 for securing transactions over open networks. The method may be implemented by the system illustrated in FIG. 3. The method comprises the general steps of preliminary transaction processing—step 42, discovery processing—step 44, application selection step—46, application processing—step 48, and transaction authorisation—step 50.

The preliminary transaction processing step 42 involves the merchant device 10, collating the variable data (which includes the transaction amount and the currency code) and static transaction data which is required to be sent to the customer device 22. In addition the CIM 12 is enabled for communications with customer device 22.

The discovery processing in step 44 follows the preliminary transaction processing in step 42. Once the customer's device 22 is within range of the merchant device 10, communication is established via the device's respective CIMs 12. The merchant device 10 energizes its CIM 12 and establishes a connection with the customer device 22 via its CIM 12. If the merchant device 10 detects multiple contactless devices within its field of range then merchant device 10 may indicate this condition to the holder of the customer device 22 and request that only a single device be presented for the transaction.

Once communication is established between the respective devices, the merchant device 10 compiles and transmits an application selection message to the customer device 22.

Figure 5:
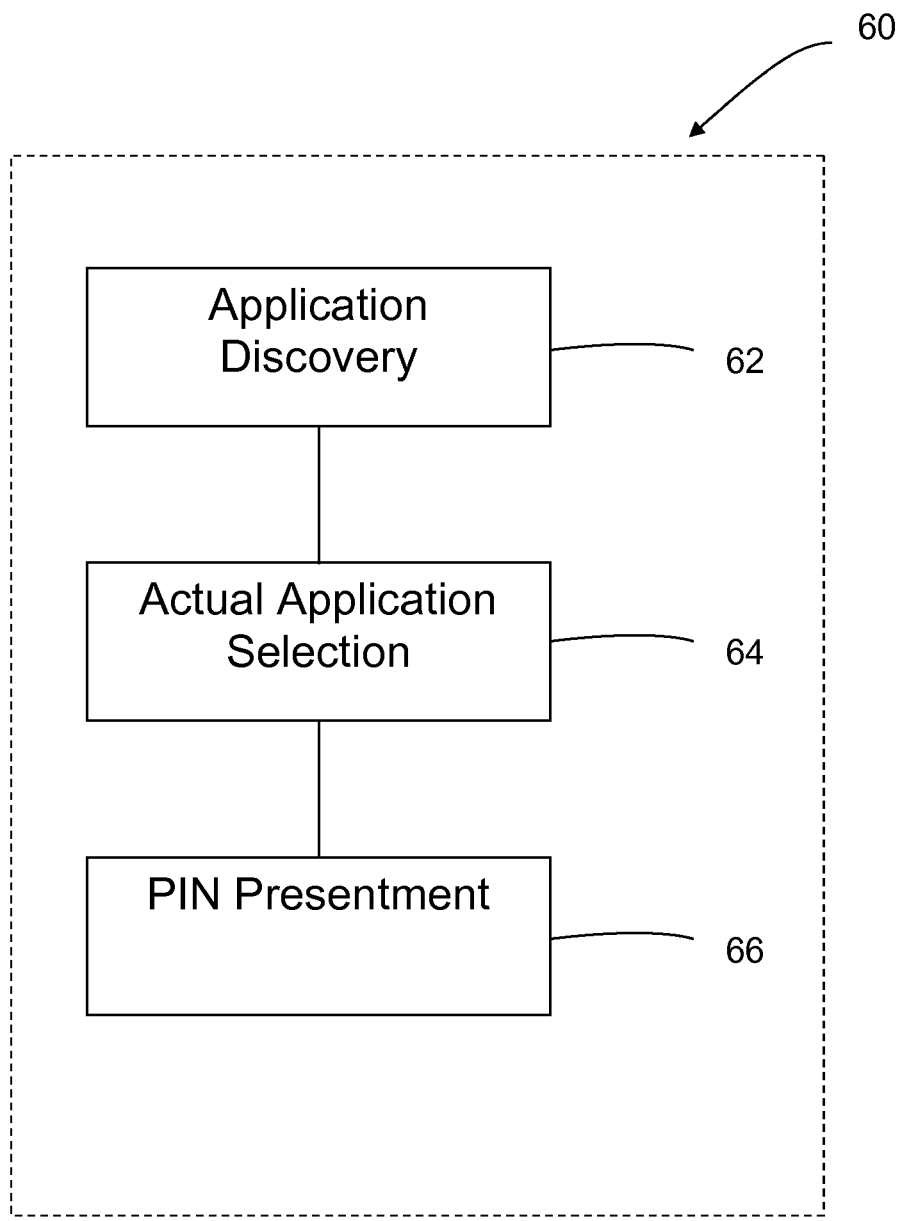
FIG. 5 is a flow chart of a specific step shown in FIG. 4.

The application selection step 46 follows the discovery processing step 44 and involves forming a response to the application selection message. The application selection step (shown in more detail with reference to FIG. 5) involves application discovery 62, actual application selection 64, and PIN presentation 66.

The application selection 60 may employ one of two methodologies. If the customer device 22 is an intelligent device which is capable of building a list of accounts then the customer device proceeds to build a list of available accounts and the customer device displays the list of accounts on the device's display for customer selection (step 62). In response, the user of the customer device 22 selects an account step 64, possibly by entry via a keypad on the body of the device 22. It should be appreciated that the keypad may be either a physical keypad or a virtual keypad. The user in response to selecting an account then enters a PIN step 66, possibly on the same keypad on the body of the device 22, the value of which is then checked against a stored reference value in memory.

The customer device 22 then responds to the application selection message and transmits the selected account information to the merchant device 10. In addition, the customer device 22 sends a request to the merchant device 10 for specific information required to complete the secure transaction.

If the customer device 22 does not have the required intelligence then in response to receiving the application selection message, the customer device 22 builds a list of available accounts and transmits the list of available accounts to the merchant device 10. The merchant device 10 then compares the accounts listed received from the customer device 22 against that which the merchant device 10 supports. The list of accounts which the merchant device 10 supports is then presented to the user of the customer device 22 on the merchant device's display, step 62. In response the user selects an account which is to be debited the value of the transaction possibly via a keypad on a user display on the body of the merchant device 10, step 64. The user in response to selecting an account then enters a PIN step 66. Data indicative of the selected account is subsequently stored to memory in the merchant device 10. In addition, the data indicative of the selected account and the presented PIN is transmitted from the merchant device 10 to the customer device 22. The customer device then checks the PIN entered data against a stored reference value in the customer device's memory. As in the first methodology, in response to the account selection request, the customer device 22 sends a request to the merchant device 10 for specific information required to complete the secure transaction.

Irrespective of the methodology employed, the specific information subsequently compiled will include various details about the capabilities of the merchant device 10 together with specific data required to process the transaction.

The application processing step 48 follows the application selection step 46 and involves compiling a command message. In response to the customer transceiver device's 22 request for specific information required to complete the secure transaction, the merchant device 10 compiles a command message which is then transmitted to the customer transceiver device 22.

The command message comprises a number of data elements or fields. A first field is populated with a unique value identifying the merchant. This value will be known to the acquiring organisations. A second field is populated with data representative of an amount for the transaction. A third field is populated with data representative of the transaction's currency code. A fourth field is populated with data representative of the customer selected account from which the transaction amount is to be debited. Additional fields may be populated with data associated with a unique number which is provided to further secure the transaction, data representative of the user selected account, and a PIN which may have been captured at the time of account selection, be this on the customer device 22 or the merchant device 10.

The merchant device 10 performs a number of risk management processes to ensure that PIN verification attempts have not been exceeded and to protect against man-in-the-middle attacks and transaction tearing. Transaction tearing describes the situation whereby a transceiver device is removed from the coupling field with another transceiver device before the transaction has completed. The transaction module application must ensure that it always knows where the process is up to should the two devices re-establish a data communication path to complete the transaction. In effect, either the respective devices assume that the transaction has not completed and all values are reset to the values prior to commencement of the transaction, or the respective devices assume that the transaction has completed with respect to the other device and each device stores data associated with any changes at the point of tearing to memory. In the later case, such data is forward to the Issuer who is responsible for resolving any discrepancies.

Following completion of the risk management process the processor 14 of the customer's device 22 builds the appropriate secure response to the command message and transmits the secure response to the merchant transceiver device 10.

The secure response is based on a cryptogram computed using a key unique to the customer device 22 together with the unique merchant identifier and all required information to process the transaction. As with the command message, the authorisation response comprises a number of data fields, the first three of which are populated with data previously received from the merchant device, those being the unique merchant identifier, the transaction amount and currency code. In addition, further fields of the secure authorisation response to the command message are populated with the Customer device's PAN or issuer application data track 2 which correspond to the user selected account, an application transaction counter (ATC) and PIN verification information indicative of a right/wrong response. The customer device 22 manages a counter value referred to as the Application Transaction Counter (ATC). The ATC is included in the cryptogram computation and incremented with each transaction, as a defense against replay attacks.

The secure response is transmitted to the merchant device 10. Included with the secure response may be the unique value identifying the merchant. Once the response is received the merchant checks the response and if the response includes a value identifying the merchant then the merchant device 10 checks that that received value corresponds to the unique identification value identifying the merchant securely stored in the merchant device's memory. On the condition that the received value identifying the merchant and the unique value identifying the merchant is one and the same the secure response is then ready to be sent to the acquirer/issuer.

The customer transceiver device 22 may now be removed from the field of range of the merchant transceiver device 10.

The authorisation step 50 follows the application processing step 48. The merchant transceiver device 10 sends the secure response to the acquirer and then to the issuer for verification. On receiving a transaction, the issuer is able to re-compute the cryptogram using their copy of the customer device's key. Based on a response subsequently received from the issuer, the merchant transceiver device 10 notifies the user of the customer transceiver device 22 if the transaction has been successful.

Assuming the re-computed data from the cryptogram is intact, the issuer will debit the user selected account the value of the transaction. The acquirer/issuer has the assurance of the identity of the merchant and the identity of the customer since the customer device 22 returns to the merchant device 10 the information it previously received, as well as other information obtained from its system to process the transaction. If a man in the middle were present, the merchant device will be subsequently alerted.

The methodology in accordance with the invention may in addition, authenticate the legitimacy of the merchant. This may be achieved by the asymmetric signing of a unique dynamic value.

When transceiver devices 10, 22 are issued they are loaded with the public key of the issuer 30, in a certificate signed by the private key of one or more certification authorities (CA). In addition, the transceiver devices 10, 22 are loaded with the public key for the one or more certification authorities in order to verify the issuer's 30 public key embedded in the certificate.

In addition, the secure module 24 of each transceiver device 10, 22 has its own pubic/private key pair loaded. The public key of each respective secure module 24 is held in a certificate unique identification value which is signed with the private key of the issuer 30.

The customer transceiver device 22 requests from the merchant transceiver device 10 the Issuer's 30 signed certificate holding the unique identification number. In addition it requests that the merchant transceiver device 10 sign a unique dynamic value using the secure module's 24 private key.

The customer transceiver device 22 verifies the CA signed Issuer certificate using the CA public key, and once authenticated, the customer transceiver device 22 authenticates the Issuer's signed secure module certificate using the public key of the Issuer and then authenticates the signed unique dynamic value using the public key loaded into the merchant's issuer signed certificate.

As should be evident to those persons skilled in the art, embodiments of the invention are advantageously much simpler in their implementation than known techniques, for instance those which utilise EMV (Europay, Mastercard and VISA). EMV does not contemplate binding the merchant and the consumer to a single transaction, in contrast EMV merely identifies that a valid card is used in a transaction. Subsequently, embodiments of the invention do not rely on the merchant device needing to secure a particular transaction, nor does it rely on the condition of a pre-existing relationship to have been established between the merchant, consumer and issuer.

It will be appreciated by persons skilled in the art that numerous variations and/or modifications may be made to the invention as shown in the specific embodiments without departing from the scope of the invention as broadly described. Furthermore, embodiments of the invention are suitable not only for a domestic market but for payment schemes within an international context. The present embodiments are, therefore, to be considered in all respects as illustrative and not restrictive.

The claims defining the invention are as follows:

1. A method to secure payment data, the method comprising:

establishing a first direct data connection between a first transceiver device and a second transceiver device so as to facilitate a first payment transaction,
wherein the first transceiver device is a customer device of the first payment transaction,
wherein a first party associated with the first transceiver device is a customer of the first payment transaction,
wherein the second transceiver device is a merchant device of the first payment transaction, and
wherein a merchant associated with the second transceiver device is a second party of the first payment transaction;
receiving by the first transceiver device a first unique static merchant identifier and a first set of transaction request data,
wherein the first unique static merchant identifier is associated with the merchant of the first payment transaction, and
wherein the first set of transaction request data is associated with the first payment transaction;
generating a cryptogram,
wherein the cryptogram is generated by the first transceiver device using a secret key,
wherein the secret key is stored securely within a memory unit of the first transceiver device,
wherein a copy of the secret key is retained securely by a first issuer associated with the first party of the first payment transaction, and
wherein the cryptogram represents the first unique static merchant identifier and at least one of a counter value, a first unique static customer identifier, and the first set of transaction request data, wherein the first unique static customer identifier is associated with the customer of the first payment transaction;
transmitting by the first transceiver device the cryptogram to the second transceiver device over the first direct data connection, thereby binding the first party to the first payment transaction; and
completing the first payment transaction.

2. A method according to claim 1, wherein establishing the first direct data connection between the first and the second transceiver devices for the first payment transaction comprises establishing a contactless connection or a contact connection.

3. A method according to claim 1, wherein establishing the first direct data connection between the first and the second transceiver devices for the first payment transaction comprises establishing a contactless connection wherein said contactless connection utilizes at least one of NFC, Bluetooth and WiFi technologies.

4. A method according to claim 1, further comprising maintaining a counter embodied in the first transceiver device, the counter being configured to produce a unique counter value associated with the first payment transaction.

5. A method according to claim 1, wherein the cryptogram represents the counter value, the first unique static merchant identifier, the first unique static customer identifier, and the first set of transaction request data.

6. A method according to claim 1, further comprising transmitting to the first transceiver device an account selection request and storing data representative of the account selection request in a memory of the second transceiver device.

7. A method according to claim 1, wherein the first set of transaction request data comprises an amount corresponding to the first payment transaction, and at least one of a currency code, a time stamp, data representative of a previously selected account of the customer, and a customer identifier comprising a PIN or a biometric.

8. A method according to claim 1, further comprising a merchant authentication process for authenticating the legitimacy of the second transceiver device being a merchant device for the first payment transaction:
wherein a first unique dynamic merchant value is transmitted from the second transceiver device to the first transceiver device over the first direct data connection;
wherein the first unique static merchant identifier was issued by a first acquirer,
wherein a copy of the first unique static merchant identifier is securely retained by the first acquirer to verify that the merchant is a valid merchant;
wherein the second transceiver device comprises a secure module comprising a first merchant private key;
wherein the first unique static merchant identifier is received by the first transceiver device within a first merchant certificate that is signed by the first acquirer,
wherein the first acquirer holds the first unique static merchant identifier and a certificate public key;
wherein the first set of transaction request data is signed using the first merchant private key; and
wherein the first transceiver device verifies the issuer's signed certificate using the first acquirer's public key, and once verified, authenticates the first set of transaction request data using the certificate public key.

9. The method of claim 1, further comprising:
terminating the first direct data connection;
establishing a second direct data connection between the first transceiver device and a third transceiver device so as to facilitate a second payment transaction,
wherein the first transceiver device is a merchant device of the second payment transaction,
wherein the first party associated with the first transceiver device is a merchant of the second payment transaction,
wherein the third transceiver device is a customer device of the second payment transaction, and
wherein a customer associated with the third transceiver device is a second party of the second payment transaction;
transmitting by the first transceiver device to the third transceiver device a second unique static merchant identifier and a second set of transaction request data,
wherein the second unique static merchant identifier is associated with the merchant of the second payment transaction, and
wherein the second set of transaction request data is associated with the second payment transaction;
receiving by the first transceiver device a cryptogram, thereby enabling the first party to bind the second party to the second payment transaction,
wherein the cryptogram is generated using a secret key, and
wherein the cryptogram represents the first unique static merchant identifier and at least one of a counter value, a second unique static customer identifier, and the second set of transaction request data, wherein the second unique static customer identifier is associated with the customer of the second payment transaction; and
completing the second payment transaction.

10. The method of claim 9, further comprising performing an issuing process on the first transceiver device for the first party of the second payment transaction, wherein the second unique static merchant identifier is stored securely within a memory unit of the first transceiver device during the issuing process, and a copy of the second unique static merchant identifier being securely retained by a second acquirer, wherein the second acquirer is associated with the first party of the second payment transaction.

11. The method of claim 10, wherein the first secret key is embedded within the memory unit of the first transceiver device during the issuing process.

12. The method of claim 1, further comprising performing an issuing process on the first transceiver device for the first party of the first payment transaction, wherein the secret key is embedded within the memory unit of the first transceiver device during the issuing process.

13. The method of claim 12, further comprising performing the issuing process on the second transceiver device for the second party of the first payment transaction, wherein the first unique static merchant identifier is stored securely within a memory unit of the second transceiver device during the issuing process, and a copy of the first unique static merchant identifier being securely retained by a first acquirer, wherein the first acquirer is associated with the second party of the first payment transaction.

14. A secure payment transceiver device operable to secure payment data, the secure payment transceiver device comprising:
an interface module to enable direct data communication with at least a second secure payment transceiver device, the second secure payment transceiver device being either a merchant device associated with a first payment transaction or a customer device associated with a second payment transaction, the secure payment transceiver device being a customer device for the first payment transaction and a merchant device for the second payment transaction, wherein a customer associated with the customer device is a first party of the respective payment transaction and a merchant associated with the merchant device is a second party of the respective payment transaction; and
a processor coupled to a memory, the memory storing merchant processor control code and customer processor control code to control the processor when the secure payment transceiver device operates as a merchant device or a customer device, respectively,
wherein the merchant processor control code causes the processor to:
(i) retrieve from memory a merchant certificate containing a unique static merchant identifier, the unique static merchant identifier having been issued by a first acquirer, wherein a copy of the unique static merchant identifier is securely retained by the first acquirer to verify that the merchant is a valid merchant;
(ii) enable the interface module to transmit (1) the merchant certificate and (2) transaction request data to the second secure payment transceiver device;
(iii) receive from the second secure payment transceiver device an authorization response message, thereby enabling the merchant to bind the customer to the payment transaction, the authorization response message comprising a cryptogram, the cryptogram having been generated from a secret key using a counter value, the unique static merchant identifier, a unique static customer identifier and the transaction request data; and
(iv) form an authorization request comprising the cryptogram, and wherein the customer processor control code causes the processer to:
  receive a merchant certificate containing a unique static merchant identifier and transaction request data from a second secure payment transceiver device, the unique static merchant identifier having been issued by a second acquirer, wherein a copy of the unique static merchant identifier is securely retained by the second acquirer to authenticate the legitimacy of the second secure payment transceiver device;
  retrieve from memory a unique static customer identifier, a counter value, and a stored secret key;
  generate a cryptogram using the retrieved secret key, the cryptogram representing the received unique static merchant identifier and at least one of the retrieved counter value, the retrieved unique static customer identifier, and the received transaction request data;
  generate an authorization response message comprising the cryptogram; and
  transmit the authorization response message to the second secure payment transceiver device, thereby binding the customer to the payment transaction.

15. A transceiver device according to claim 14 wherein the interface module is in the form of a contact interface module, a contactless interface module, or a dual contact and contactless interface module.

16. A method to secure payment data, the method comprising:
  establishing a first direct data connection between a first transceiver device and a second transceiver device so as to facilitate a first payment transaction,
    wherein the first transceiver device is a merchant device of the first payment transaction,
    wherein a first party associated with the first transceiver device is a merchant of the first payment transaction,
    wherein the second transceiver device is a customer device of the first payment transaction, and
    wherein a customer associated with the second transceiver device is a second party of the first payment transaction;
  transmitting over the first direct data connection a first unique static merchant identifier and a first set of transaction request data,
    wherein the first unique static merchant identifier is associated with the merchant of the first payment transaction, and
    wherein the first set of transaction request data is associated with the first payment transaction;
  receiving by the first transceiver device a first cryptogram, thereby enabling the first party to bind the second party to the first payment transaction,
    wherein the first cryptogram is generated using a secret key, and
    wherein the first cryptogram represents the first unique static merchant identifier and at least one of a counter value, a first unique static customer identifier, and the first set of transaction request data, wherein the first unique static customer identifier is associated with the customer of the first payment transaction; and
  completing the first payment transaction.

17. A method according to claim 16, wherein establishing the first direct data connection between the first and second transceiver devices for the first transaction comprises establishing a contactless connection or a contact connection.

18. The method of claim 16, further comprising an authorization process, the authorization process comprising:
  transmitting over an open communication network the first cryptogram; and
  receiving from a third party an authorization for completing the first payment transaction, the third party being one of a first issuer and a first acquirer, the first issuer being associated with the customer of the first payment transaction and the first acquirer being associated with the merchant of the first payment transaction,
    wherein at least some information necessary for authorizing the first payment transaction is secured within the cryptogram, thereby reducing risks associated with transmitting such information over the open communication network.

19. The method of claim 16, further comprising a settlement process, the settlement process comprising:
  transmitting over an open communication network the first cryptogram; and
  receiving from a third party confirmation of settlement associated with the first payment transaction, the third party being one of a first issuer and a first acquirer, the first issuer being associated with the customer of the first payment transaction and the first acquirer being associated with the merchant of the first payment transaction,
    wherein at least some information necessary for settlement of the first payment transaction is secured within the cryptogram, thereby reducing risks associated with transmitting such information over the open communication network.

20. The method of claim 19, wherein the settlement process is initiated after the first payment transaction is completed, and wherein an authorization process is not required for the first payment transaction.

21. The method of claim 20, further comprising:
  terminating the first direct data connection;
  establishing a second direct data connection between the first transceiver device and a third transceiver device so as to facilitate a second payment transaction,
    wherein the first transceiver device is a customer device of the second payment transaction,
    wherein the first party associated with the first transceiver device is a customer of the second payment transaction,
    wherein the third transceiver device is a merchant device of the second payment transaction, and
    wherein a merchant associated with the third transceiver device is a second party of the second payment transaction;
  receiving by the first transceiver device a second unique static merchant identifier and a second set of transaction request data,
    wherein the second unique static merchant identifier is associated with the merchant of the second payment transaction, and
    wherein the second set of transaction request data is associated with the second payment transaction;
  generating a cryptogram,
    wherein the cryptogram is generated by the first transceiver device using a secret key,
    wherein the secret key is stored securely within a memory unit of the first transceiver device,
    wherein a copy of the secret key is retained securely by a first issuer associated with the first party of the second payment transaction; and
    wherein the cryptogram represents the second unique static merchant identifier and at least one of a counter value, a second unique static customer identifier, and the second set of transaction request data, wherein the second unique static customer identifier is associated with the customer of the second payment transaction;

transmitting by the first transceiver device the cryptogram to the second transceiver device over the second direct data connection, thereby binding the first party to the second payment transaction; and completing the second payment transaction.

* * * * *